(12) United States Patent
Jeon et al.

(10) Patent No.: US 8,831,104 B2
(45) Date of Patent: *Sep. 9, 2014

(54) METHOD FOR MODELING CODING INFORMATION OF A VIDEO SIGNAL TO COMPRESS/DECOMPRESS THE INFORMATION

(71) Applicant: LG Electronics Inc., Seoul (KR)

(72) Inventors: Byeong Moon Jeon, Seoul (KR); Doe Hyun Yoon, Seoul (KR); Ji Ho Park, Seoul (KR); Seung Wook Park, Seoul (KR); Dong Seok Kim, Seoul (KR); Soung Hyun Um, Anyang-si (KR)

(73) Assignee: LG Electronics Inc. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/675,550

(22) Filed: Nov. 13, 2012

(65) Prior Publication Data

US 2013/0070850 A1    Mar. 21, 2013

Related U.S. Application Data

(63) Continuation of application No. 12/805,322, filed on Jul. 26, 2010, now Pat. No. 8,331,453, which is a (Continued)

(30) Foreign Application Priority Data

Sep. 5, 2005   (KR) .................. 10-2005-0082195

(51) Int. Cl.
*H04N 7/12* (2006.01)
*H04N 11/02* (2006.01)
(Continued)

(52) U.S. Cl.
CPC .............................. *H04N 19/00121* (2013.01)
USPC ................................................... 375/240.16

(58) Field of Classification Search
CPC ................................................ H04N 19/00121

USPC ....................................................... 375/240.16
See application file for complete search history.

(56) References Cited

U.S. PATENT DOCUMENTS 6,510,177 B1    1/2003  De Bonet et al.
6,646,578 B1   11/2003  Au
(Continued)

FOREIGN PATENT DOCUMENTS

EP       1715693        10/2006
EP       1715693 A3      1/2007
(Continued)

OTHER PUBLICATIONS

Y. Bao et al., "Improvements to Fine Granularity Scalability for Low-Delay Applications", Joint Video Team (JVT) of ISO/IEC MPEG & ITU-T VCEG (ISO/IEC JTC1/SC29/WG11 and ITU-T SG16 Q.6), 15th Meeting: Busan, Korea, Apr. 18-22, 2005.

(Continued)

*Primary Examiner* — Jeremaiah C Hallenbeck-Huber
(74) *Attorney, Agent, or Firm* — Harness, Dickey & Pierce, PLC

(57) ABSTRACT

A method and an apparatus of decoding a video signal are provided. The present invention includes the steps of parsing first coding information indicating whether a residual data of an image block in the enhanced layer is predicted from a corresponding block in the base layer, from the bitstream of the enhanced layer, and decoding the video signal based on the first coding information. And, the step of parsing includes the step of performing modeling of the first coding information based on second coding information indicating whether prediction information of the corresponding block in the base layer is used to decode the image block in the enhanced layer. Accordingly, the present invention raises efficiency of video signal processing by enabling a decoder to derive information on a prediction mode of a current block in a decoder instead of transferring the information to the decoder.

8 Claims, 7 Drawing Sheets

Related U.S. Application Data continuation of application No. 11/988,385, filed as application No. PCT/KR2006/002703 on Jul. 10, 2006, now Pat. No. 8,320,453.

(60) Provisional application No. 60/697,353, filed on Jul. 8, 2005, provisional application No. 60/715,167, filed on Sep. 9, 2005.

(51) Int. Cl.
*H04N 11/04* (2006.01)
*H04N 7/26* (2006.01)

(56) References Cited

U.S. PATENT DOCUMENTS

| | | | |
|---|---|---|---|
| 7,072,394 | B2 | 7/2006 | Huang et al. |
| 7,253,831 | B2 | 8/2007 | Gu |
| 7,286,710 | B2 | 10/2007 | Marpe et al. |
| 7,292,165 | B2 | 11/2007 | Cha et al. |
| 7,379,608 | B2 | 5/2008 | Marpe et al. |
| 8,306,117 | B2 | 11/2012 | Jeon et al. |
| 8,320,453 | B2 * | 11/2012 | Jeon et al. ........ 375/240.16 |
| 2002/0021761 | A1 | 2/2002 | Zhang et al. |
| 2002/0118742 | A1 | 8/2002 | Puri et al. |
| 2006/0013493 | A1 * | 1/2006 | Yang et al. ........ 382/232 |
| 2006/0126744 | A1 | 6/2006 | Peng et al. |
| 2006/0232447 | A1 | 10/2006 | Walker et al. |
| 2006/0233254 | A1 | 10/2006 | Lee et al. |

FOREIGN PATENT DOCUMENTS

| | | |
|---|---|---|
| KR | 20060038189 A | 5/2006 |
| KR | 2006083100 | 7/2006 |
| KR | 20060082199 A | 7/2006 |
| RU | 2128405 C1 | 3/1999 |
| RU | 2201654 C2 | 3/2003 |
| WO | WO-9216071 A1 | 9/1992 |
| WO | WO-9933273 A1 | 7/1999 |
| WO | WO-03017672 A2 | 2/2003 |
| WO | WO-03017672 A3 | 4/2004 |
| WO | WO-2006075901 A1 | 7/2006 |

OTHER PUBLICATIONS

Notice of Allowance issued Feb. 5, 2009 by the Russian Patent Office in couterpart Russian Patent Application No. 2008104816/09 (with English language translation).
T. Wiegand et al., "Draft Text of Final Draft International Standard (FDIS) of Joint Video Specification (ITU-T Rec. H.264, ISO/IEC 14496-10 AVC)", pp. i-xiv, 1-245, Joint Video Team (JVT) of ISO/IEC MPEG & ITU-T VCEG (ISO/IEC JTC1/SC29/WG11 and ITU-T SG16 Q.6), 7th Meeting, Pattaya, Thiland, Mar. 7-14, 2003.
J. Reichel et al., "Joint Scalable Video Model (JSVM) 2.0 Reference Encoding Algorithm Description", pp. 1-32, Joint Video Team (JVT) of ISO/IEC MPEG & ITU-T VCEG (ISO/IEC JTC1/SC29/WG11 and ITU-T SG16 Q.6), Buzan, Korea, Apr. 2005.
Notice of Allowance issued Dec. 26, 2008 by the Korean Patent Office in counterpart Korean Patent Application No. 10-2008-7003053.
Office Action issued Nov. 13, 2008 by the Russian Patent Office in counterpart Russian Patent Application No. 2008104816/09 (with English language translation).
W. Peng, C. Wang, T. Chiang and H. Hang, "Context-Based Binary Arithmetic Coding with Stochastic Bit Reshuffling for Advanced Fine Granualitiy Scalability," Proc. of the 2004 Int'l. Symposium on Circuits and Systems (ISCAS'04), vol. 3, pp. III-953-8, May 23-26, 2004.
J. Han, X. Sun, F. Wu, S. Li and Z. Lu, "Variable Block-Size Transform and Entropy Coding at the Enhancement Layer of FGS," Proc. of Int'l Conf. Image Processing (ICIP'04), vol. 1 pp. 481-484, Oct. 24-27, 2004.
International Search Report issued Oct. 30, 2006 in counterpart International Patent Application No. PCT/KR2006/002703.
D. Marpe, H. Schwarz, T. Wiegand, "Context-based Adaptive Binary Arithmetic Coding in the H.264/AVC Video Compression Standard," IEEE Trans. Circuits Syst. for Video Tech., vol. 13, No. 7, pp. 620-636, Jul. 2003.
ISO/IEC JTC1/SC29/WG11, "Text of ISO/IEC 14496-10 FDIS Advanced Video Coding," MPEG Document N5555, Pattaya, Mar. 2003.
International Search Report issued Oct. 19, 2006 in counterpart International Patent Application No. PCT/KR2006/002699.
Written Opinion of the International Searching Authority issued Oct. 19, 2006 in counterpart International Patent Application No. PCT/KR2006/002699.
USPTO Office Action dated Dec. 18, 2009 for corresponding U.S. Appl. No. 11/988,385.
European Search Report dated Mar. 29, 2010 for corresponding Application No. 06757769.2.
Choi W et al: "SVC CE3 Improved entropy coding efficiency" Joint Video Team (JVT) of ISO/IEC MPEG & ITU-T VCEG (ISO/IEC JTC1/SC29/WG11 and ITU-T SG16 Q6), No. JVT-0021r1, Apr. 21, 2005, XP030005969.
Woong IL Choi et al: "The efficient coding technique using inter-layer prediction" Joint Video Team (JVT) of ISO/IEC MPEG & ITU-T VCEG ((ISO/IEC JTC1/SC29/WG11 and ITU-T SG16 Q6), No. M11667, Jan. 17, 2005, XP030040412.
JVT: "Core experiment 3: Coding efficiency improvement of entropy coding" Joint Video Team (JVT) of ISO/IEC MPEG & ITU-T VCEG (ISO/IEC JTC1/SC29/WG11 and ITU-T SG16 Q6), No. JVT-0303, Apr. 22, 2005, XP030006031.
Jungong Han et al: "Veriable block-size transform and entropy coding at the enhancement layer of FGS", International Conference on Image Processing, vol. 1, Oct. 24, 2004, XP010784859.
USPTO Office Action dated Jun. 4, 2010 for corresponding U.S. Appl. No. 11/988,385.
Japanese Office Action dated Aug. 12, 2010 in corresponding Japanese Application No. 2008-520193.
Woon Ii Choi, Byeungwoo Jeon: "The report of CE 3 Improve coding efficiency of entropy coding", Joint Video Team (JVT) of ISO/IEC MPEG & IT U-T VCEG (ISO/IEC JTC1/SC29/WG11 and ITU-T SG16 Q6) 15th Meeting: Busan, KR, Apr. 16-22, 2005 [JVT-0021].
Woong Ii Choi, "CE 3, Improve coding efficiency of entropy coding", Joint Video Team (JVT) of ISO/IEC MPEG & IT U-T VCEG (ISO/IEC JTC1/SC29/WG11 and ITU-T SG16 Q6) 15th Meeting, Busan, KR Apr. 16-22, 2005 [JVT-0303].
U.S. Office Action dated Nov. 28, 2011 issued in corresponding U.S. Appl. No. 11/988,385.
U.S. Office Action dated Jan. 13, 2012 issued in corresponding U.S. Appl. No. 12/805,322.
Korean Notice of Allowance dated Mar. 2, 2012 issued in corresponding Korean Application No. 10-2008-7027524 with English translation thereof.
English language translation of Russian Office Action dated Sep. 4, 2012 for Application No. 2009110693.
Joint Video Team (JVT) of ISO/IEC MPEG & ITU-T VCEG (ISO/IEC JTC/SC29/WG11 and ITU-T SG16 Q.6) 15th Meeting, Busan, KR Apr. 16-22, 2005. Document JVT-O064.
Aug. 22, 2013 Russian Notice of Allowance issued in 2009110693 (with translation).
US Office Action issued in U.S. Appl. No. 13/670,017 dated Jul. 16, 2014.

\* cited by examiner

FIG. 2

| mb_type | bin string |
|---------|------------|
| Intra | 0 |
| P_8x8 | 100 |
| P_8x16 | 101 |
| P_16x8 | 110000 |
| P_16x16 | 110001 |
| Direct | 110010 |

FIG. 4

```
preCtxState = Clip3(1,126,((m*SliceQPY)>>4)+n)    401
if(preCtxState <= 63){
    pStateIdx = 63 - preCtxState
    valMPS = 0
} else {
    pStateIdx = preCtxState - 64
    valMPS = 1
}
```

METHOD FOR MODELING CODING INFORMATION OF A VIDEO SIGNAL TO COMPRESS/DECOMPRESS THE INFORMATION

PRIORITY STATEMENT

This application is a continuation of U.S. patent application Ser. No. 12/805,322 filed on Jul. 26, 2010, which is a continuation of U.S. patent application Ser. No. 11/988,385 filed on Jun. 9, 2009, which is a national stage application of PCT/KR2006/002703 filed on Jul. 10, 2006, which claims priority to Korean App. No. 10-2005-0082195 filed on Sep. 5, 2005, which claims the benefit of U.S. App. No. 60/697,353 filed on Jul. 8, 2005 and U.S. App. No. 60/715,167 filed on Sep. 9, 2005, the contents of each of which is incorporated by reference in their entirety.

TECHNICAL FIELD

The present invention relates to a method for modeling coding information of a video signal using entropy coding in order to compress or decompress the coding information.

BACKGROUND ART

Scalable Video Coding (SVC) is a coding scheme that encodes video into a sequence of pictures with the highest image quality while ensuring that part of the encoded picture sequence (specifically, a partial sequence of frames intermittently selected from the total sequence of frames) can be decoded and used to represent the video with a low image quality.

Although it is possible to represent low image-quality video by receiving and processing part of a sequence of pictures encoded according to a scalable coding scheme, there is still a problem in that the image quality is significantly reduced if the bitrate is lowered. One solution to this problem is to provide an auxiliary picture sequence for low bitrates, for example, a sequence of pictures that have a small screen size and/or a low frame rate.

The auxiliary picture sequence is referred to as a base layer, and the main picture sequence is referred to as an enhanced layer. When it is used in a decoder, the main picture sequence is also referred to as a current layer to be decoded based on the base layer. When the base layer is provided, inter-layer prediction is performed to increase coding efficiency.

The SVC can be used in combination with an MPEG-4 video codec or an MPEG-4 Advanced Video Codec (AVC), which is also referred to as "H.264". To adaptively apply binary arithmetic coding, which is an entropy coding scheme, according to adjacent coding information, there is a need to define a method for encoding or decoding coding data (for example, syntax information) of the video codec.

DISCLOSURE OF INVENTION

An object of the present invention is to provide a method for context modeling of coding information in order to increase data compression rate using Context Adaptive Binary Arithmetic Coding (CABAC), which is an entropy coding scheme of the AVC, when the scalable coding scheme is combined with the MPEG-4 AVC.

The object of the present invention can be achieved by providing a modeling method, wherein an initial value of a function for probability coding of coding information of an image block in a first layer (e.g., a current layer) is determined based on coding information of a second layer (e.g., a base layer) different from the first layer.

In an embodiment of the present invention, flags, which can be used for determining the initial value of the function for probability coding of the coding information, include a flag "base_mode_flag" indicating whether or not image data coded in an intra mode or motion vector information of a block in the second layer corresponding to the image block is to be used for the image block, a flag "base_mode_refinement_flag" indicating whether or not refinement is necessary for the image block to use motion vector information of a block in the second layer corresponding to the image block, a flag XNresidual_prediction_flag" indicating whether or not residual data of the image block has been coded using data predicted from residual data of a block in the second layer corresponding to the image block, a flag "intra_base_flag" indicating whether or not image data of the image block has been coded into difference data based on image data of an intra mode block in the second layer corresponding to the image block, a flag "mvd_ref_1X" indicating a refinement value required to obtain a motion vector of the image block using motion vector information of a block in the second layer corresponding to the image block, and a flag λλmotion_prediction_flag_1X" indicating whether or not a motion vector of a block in the second layer corresponding to the image block is to be used for a predictive motion vector of the image block.

In another embodiment of the present invention, coding information of a block in the second layer corresponding to the image block is used as the coding information of the second layer. And the coding information of a block in the second layer is corresponding to the coding information of the image block.

In another embodiment of the present invention, information indicating whether a block in the second layer corresponding to the image block has been coded in an inter mode or in an intra mode is used as the coding information of the second layer.

In another embodiment of the present invention, the initial value is determined based on whether or not partition information of a block in the second layer corresponding to the image block is identical to partition information of the image block.

In another embodiment of the present invention, the initial value is determined based on a quantization parameter value of a block in the second layer corresponding to the image block or based on the difference between the quantization parameter value of the block in the second layer and a quantization parameter value of the image block.

In another embodiment of the present invention, the initial value is determined based on the difference between a motion vector of the image block and a motion vector of a block in the second layer corresponding to the image block.

In another embodiment of the present invention, the initial value is determined based on whether or not a value indicating a reference picture of the image block is identical to a value indicating a reference picture of a block in the second layer corresponding to the image block.

In another embodiment of the present invention, the initial value is determined based on whether or not spatial resolution of the image block is identical to spatial resolution of a block in the second layer corresponding to the image block.

In another embodiment of the present invention, the block pattern information indicating whether or not a value other than 0 is present in a block in the second layer corresponding to the image block, is used as the coding information of the second layer.

In another embodiment of the present invention, in order to determine the initial value, two constants "m" and "n" are selected based on the coding information of the second layer, an intermediate value is determined based on the selected constants "m" and "n" and information associated with coding of the second layer (for example, a quantization parameter value of the second layer, the difference between quantization parameter values of the first and second layers, or a spatial resolution ratio between the first and second layers), and an initial probability value and an MPS of the coding information are determined based on whether or not the intermediate value is greater than a predetermined value.

BRIEF DESCRIPTION OF DRAWINGS

FIG. 2 illustrates an example of binarization of input coding information;

FIG. 4 illustrates a routine for determining an initial value for probability coding.

BEST MODE FOR CARRYING OUT THE INVENTION

Reference will now be made in detail to the preferred embodiments of the present invention, examples of which are illustrated in the accompanying drawings.

Figure 1:
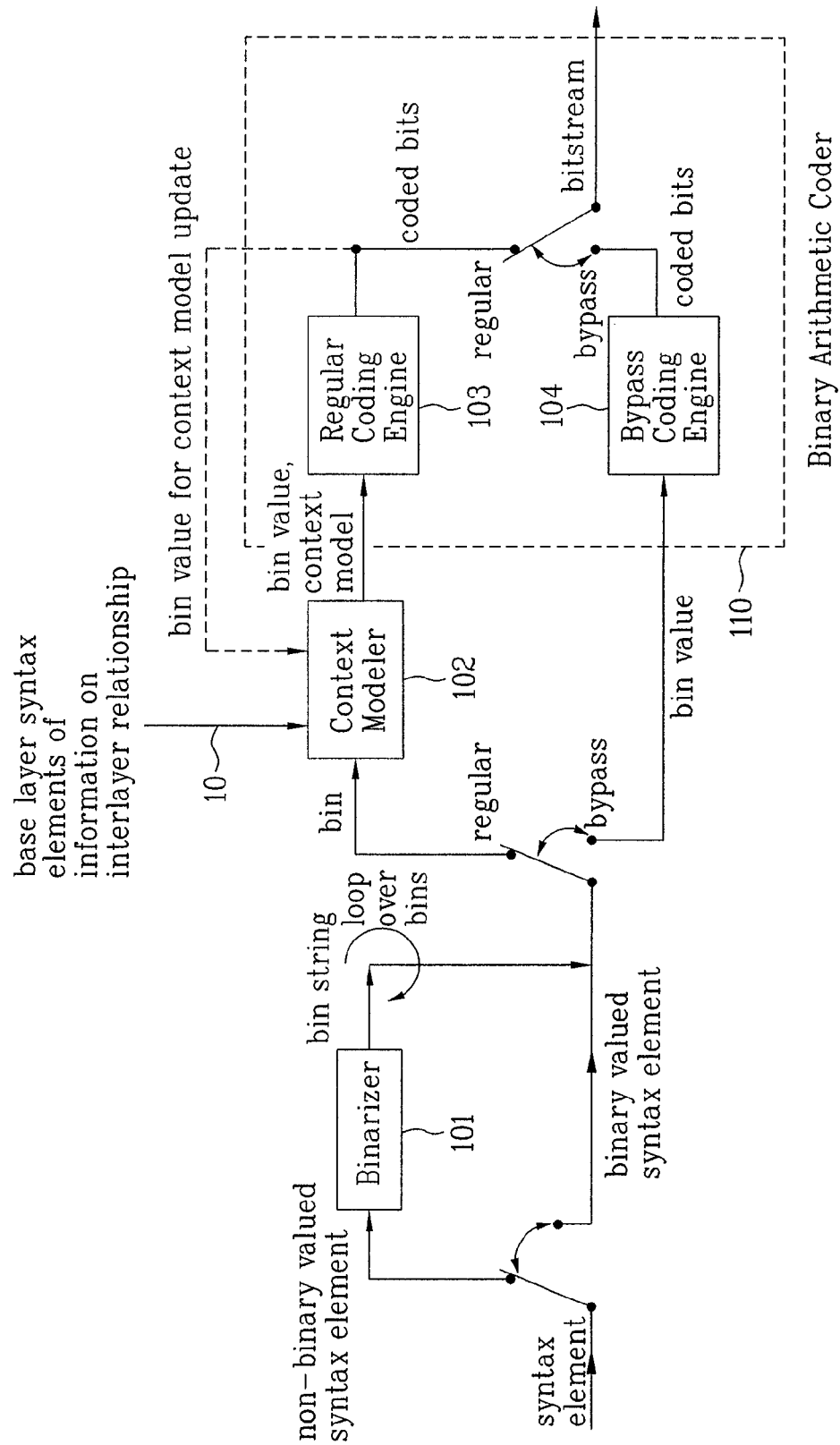
FIG. 1 is a block diagram of a CABAC executer of an enhanced layer encoder, which performs context modeling according to the present invention.

FIG. 1 is a block diagram of a CABAC executer of the enhanced layer according to a preferred embodiment of the present invention. The CABAC executer shown in FIG. 1 includes a binarizer 101, a context modeler 102, and an arithmetic coder 110. The binarizer 101 binarizes input non-binary valued coding information according to a specified scheme. Specifically, the binarizer 101 converts a non-binary valued syntax element into a bin string as illustrated in FIG. 1. The context modeler 102 models each bit of binary valued coding information based not only on coding information in an adjacent block in the same layer (in the enhanced layer in this example) but also on base layer coding information correlated with the binary valued coding information or inter-layer relationship information 10. The arithmetic coder 110 performs arithmetic coding on an input bit based on a set model.

The arithmetic coder 110 includes a regular coding engine 103 for performing arithmetic coding on bits of the coding information based on variables (specifically, probability functions and initial values of the probability functions) modeled by the context modeler 102, and a bypass coding engine 104 for performing arithmetic coding on coding information which does not benefit from modeling since bits 0 and 1 of the coding information have almost the same probability of occurrence.

The present invention, which involves modeling of input coding information, is not directly related to the arithmetic coding procedure based on the modeled variables. Thus, a description of bit compression (entropy coding) associated with the arithmetic coder 110, which is not necessary for understanding the present invention, is omitted herein.

When the input coding information has a non-binary value, the CABAC executer of FIG. 1 binarizes the value of the input coding information through the binarizer 101. FIG. 2 illustrates an example of the binarization. Coding information used in the example of FIG. 2 is associated with macroblock types (mb_type). The macroblock types (Direct, Intra, P_16×16, P_16×8, P_8×16, and P_8×8) are assigned respective binary values according to a predetermined scheme (or transform table). Other coding information is binarized according to other schemes (or other transform table) specified for corresponding elements in a similar manner to that of FIG. 2.

For bit compression, bits obtained through the above binarization are input to the arithmetic coder 110. Bits of coding information, which have the same probability of bit values 0 and 1 occurring in the coding information, are directly input to the bypass coding engine 104, whereas bits of coding information, which have different probabilities of bit values 0 and 1 occurring in the coding information, are input to the context modeler 102 so that the input bits are subjected to a modeling process.

Figure 3:
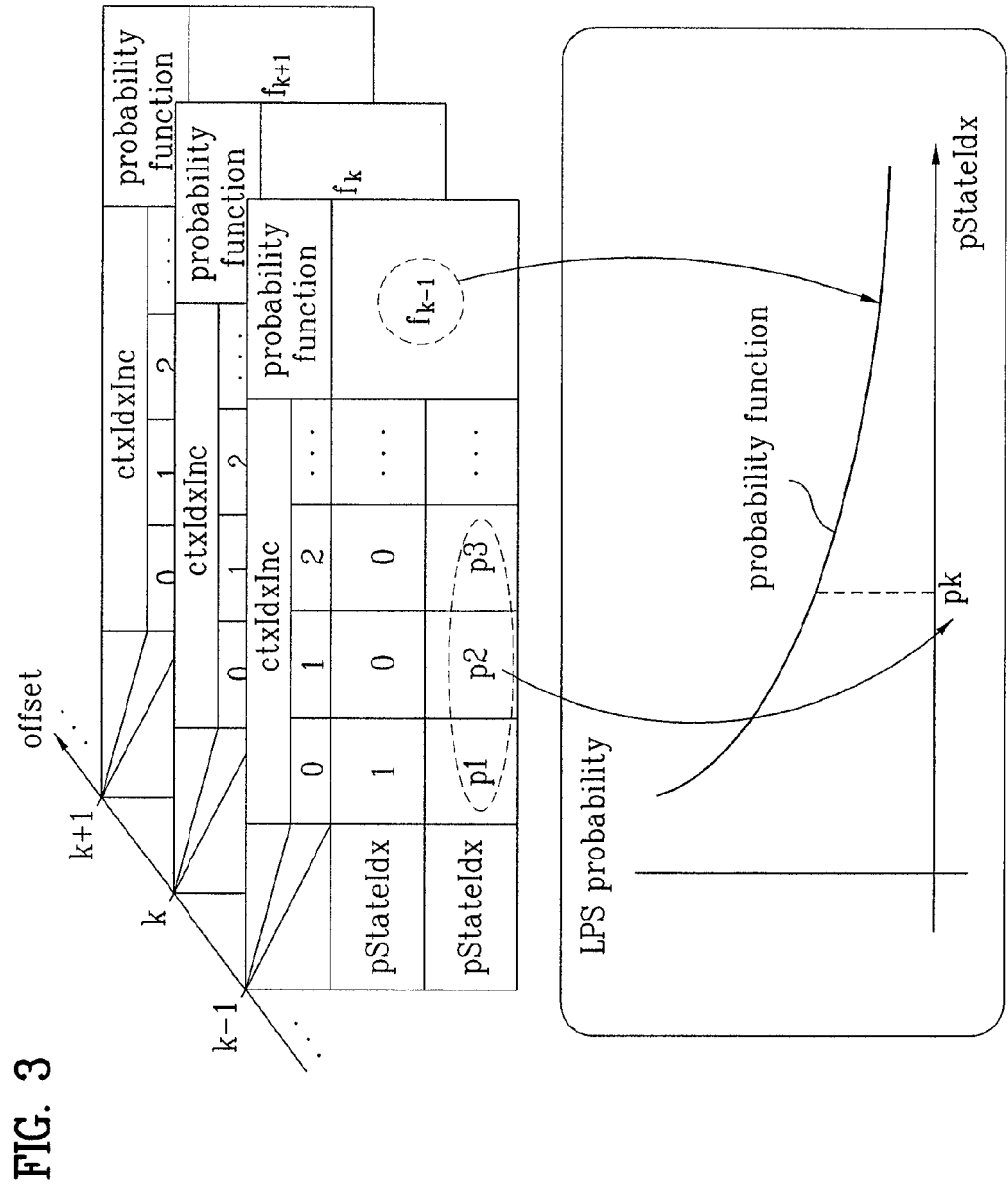
FIG. 3 illustrates a context modeling method for probability coding of coding information.

The context modeler 102 performs modeling of bits of input coding information in the enhanced layer based on coding information correlated with bit values of corresponding coding information of an adjacent macroblock and/or a value of corresponding coding information received from a base layer encoder (not shown) or based on information 10 regarding the relationship between the enhanced layer and the base layer. Modeling is a process of selecting a probability function and determining an initial value of the probability function. As illustrated in FIG. 3, an offset value ( . . . , k−1, k, k+1, . . . ) is determined according to coding information so that a probability function ( . . . , $f_{k-1}, f_k, f_{k+1}, \ldots$ ) of the coding information is selected, and a value of an index variable "ctxIdxInc" is determined from the offset value according to information correlated with the coding information. As the value of the index variable "ctxIdxInc" is determined, initial values "valMPS" and "pStateIdx" for use with the probability function are determined. As the initial value "pStateIdx" is determined, an initial probability of the LPS (or MPS) is determined as illustrated in FIG. 3. Accordingly, the regular coding engine 103 codes (or compresses) bits of the input coding information using the selected probability function, starting from the determined initial values "valMPS" and "pStateIdx".

We now suggest detailed examples of a method for determining the value of the index variable "ctxIdxInc" when the context modeler 102 performs modeling. A variety of examples suggested below are simply examples of the method for modeling specific coding information of the enhanced layer based on coding information correlated with the value of the specific coding information or based on the relationship between the enhanced and base layers. Thus, the present invention is not limited to the examples suggested below, and any method, which is characterized by modeling coding information of the enhanced layer based on coding information correlated with an element value of the coding information or based on the relationship between the enhanced and base layers, falls within the scope of the present invention.

First, a description will be given of a variety of methods for determining an index variable "ctxIdxInc" of a flag "base_mode_flag", which indicates whether or not coding information (for example, motion vector information or intra-mode image data) of a block in the base layer corresponding to any macroblock is to be used for the macroblock.

$$\text{ctxIdxInc}=\text{condTermFlag}A+\text{condTermFlag}B+\text{condTermFlagBase} \quad (1\text{-}1).$$

Here, "A" and "B" denote adjacent macroblocks located on the upper and left sides of a current macroblock X. A flag "condTermFlagN" (N=A or B) has a value of "0" if a macroblock N is not available or if a flag "base_mode_flag" of the macroblock N is 0, otherwise it has a value of "1". Similarly, a flag "condTermFlagBase" has a value of "0" if a block in the base layer corresponding to the current macroblock X is not present or if a flag "base_mode_flag" of the corresponding block is 0, otherwise it has a value of "1". That is, a value of corresponding coding information of the base layer is used as a basis for determining a value of the index variable "ctxIdxInc". This indicates that an initial value for probability coding varies depending on the value of the corresponding coding information of the base layer.

$$\text{ctxIdxInc}=\text{condTermFlag}A'+\text{condTermFlag}B'+\text{condTermFlagBase}' \quad (1\text{-}2).$$

Here, a flag "conTermFlag'" of a block is assigned a value of "0" or "1" depending on whether the block is in an inter mode or in an intra mode. For example, a flag "condTermFlagBase'" has a value of "0" (or "1") if a block in the base layer corresponding to the current macroblock X is in an inter mode, and has a value of "1" (or "0") if the corresponding block is in an intra mode.

In this method, the (inter or intra mode) modes of the two adjacent blocks A and B and the corresponding block in the base layer are used as a basis for determining the initial value of the probability function for coding the bit of the flag "base_mode_flag".

Alternatively, only the flag "condTermFlagBase'" (i.e., only the mode of the corresponding block in the base layer) may be used as a basis for determining the value of the index variable "ctxIdxInc" so that the initial value varies depending only on the value of the flag "condTermFlagBase'".

$$\text{ctxIdxInc}=(\text{BaseBlkSize}==\text{EnhanceBlkSize})?1:0+\text{condTermFlagA}+\text{condTermFlagB} \quad (1\text{-}3).$$

In this method, a value indicating whether or not a partition of a block in the base layer is identical to that of a block in the enhanced layer (for example, a value of "1" when identical and a value of "0" when not identical) or a value indicating whether or not the size of a block in the enhanced layer is equal to that of a corresponding block in the base layer (for example, a value of "1" when equal and a value of "0" when not equal) is used as a basis for determining the initial value of the probability function.

$$\text{ctxIdxInc}=\text{condTermFlag}A''+\text{condTermFlag}B''+\text{condTermFlagBase}'' \quad (1\text{-}4).$$

Here, a flag "condTermFlag''" of a block is assigned a value of "1" if a quantization parameter of the block has a value equal to or greater than a predetermined threshold, otherwise it is assigned a value of "0". In this method, quantization parameters of the two adjacent blocks A and B and a quantization parameter of the corresponding block in the base layer are used as a basis for determining the initial value of the probability function for coding the bit of the flag "base_mode_flag".

The "condTermFlag''" of a block can also be assigned a value of "1" or "0" depending on the difference between the value of a quantization parameter of the block and the value of a different quantization parameter, rather than depending on the quantization parameter of the block, so that the value of the index "ctxIdxInc" is determined based on the value of the flag "condTermFlag''" For example, a flag "condTermFlagN''" of a block N is assigned a value of "1" if the difference between the value of a quantization parameter of the block N and the value of a quantization parameter of a block in the base layer corresponding to the block N is equal to or greater than a predetermined threshold, otherwise the flag "condTermFlagN''" is assigned a value of "0". In this example, "condTermFlagBase''" denotes a flag indicating whether the difference between the value of a quantization parameter of the current block X and the value of a quantization parameter of a block in the base layer corresponding to the current block X is greater or less than the predetermined threshold.

Alternatively, only the flag "condTermFlagBase''" (i.e., only the value of the quantization parameter of the block in the base layer corresponding to the current block X (or only the difference between the value of the quantization parameter of the current block X and the value of the quantization parameter of the corresponding block)) may be used as a basis for determining the value of the index variable "ctxIdxInc" so that the initial value varies depending only on the value of the flag "condTermFlagBase''".

$$\text{ctxIdxInc}=0 \text{ (if C}\geq\text{threshold 1)}, \quad (1\text{-}5).$$

1 (if threshold 1>C≥threshold 2),
2 (if C<threshold 2)

Here, "C" denotes a motion vector of the corresponding block in the base layer or the difference between the motion vector of the corresponding block and a motion vector of one of the adjacent macroblocks or an average motion vector of the adjacent macroblocks.

That is, the motion vector of the base layer is used as a basis for determining the initial value of the probability function.

$$\text{ctxIdxInc}=(\text{refIdx}_{Enhance}\text{L1}==\text{refIdx}_{Base}\text{L1})?1:0+\\(\text{refIdx}_{Enhance}\text{L0}==\text{refIdxBaseL0})?1:0 \quad (1\text{-}6).$$

In this method, a value indicating whether or not indices of reference picture refIdxL0 and refIdxL1 in picture groups L0 and L1 of a macroblock having coding information, which is to be currently coded, are equal to indices of reference pictures in picture groups L0 and L1 of a corresponding block in the base layer (for example, a value of "2" when both the reference picture indices refIdxL0 and refIdxL1 in the picture groups L0 and L1 are equal to those of the base layer, a value of "1" when one of the reference picture indices refIdxL0 and refIdxL1 is equal to a corresponding one of the base layer, and a value of "0" when none of the reference picture indices refIdxL0 and refIdxL1 is equal to those of the base layer) is used as a basis for determining the initial value of the probability function, so that the initial value varies depending on the value indicating whether or not the reference picture indices in the enhanced layer are equal to those in the base layer.

A combination of the above methods (1-1 to 1-6), rather than one of the above methods, may be used to determine the initial value of the probability function for entropy coding of the flag "base_mode_flag".

Next, a description will be given of a variety of methods for determining an index variable "ctxIdxInc" of a flag "base_mode_refinement_flag" indicating whether or not refinement is necessary for any macroblock to use motion vector information of a block in the base layer corresponding to the macroblock.

Since the flag "base_mode_refinement_flag" is not used when a corresponding macroblock in the base layer has been coded in an intra mode, a method assuming the intra mode coding, for example, a method similar to the above method 1-2) are not used for modeling of the bit of the flag "base_mode_refinement_flag".

$$\text{ctxIdxInc}=\text{condTermFlag}A+\text{condTermFlag}B+\text{condTermFlagBase} \quad (2\text{-}1).$$

A flag "condTermFlagN" (N=A or B) has a value of "0" if a macroblock N is not available or if a flag "base_mode_refinement_flag" of the macroblock N is 0, otherwise it has a value of "1". Similarly, a flag "condTermFlagBase" has a value of "0" if a block in the base layer corresponding to the current macroblock is not present or if a flag "base_mode_refinement_flag" of the corresponding block is 0, otherwise it has a value of "1". That is, a value of corresponding coding information of the base layer is used as a basis for determining a value of the index variable "ctxIdxInc".

$$\text{ctxIdxInc}=(\text{BaseBlkSize}==\text{EnhanceBlkSize})?1:0+\text{condTermFlag}A+\text{condTermFlag}B \quad (2\text{-}2).$$

This method is similar to the above method 1-3).

$$\text{ctxIdxInc}=\text{condTermFlag}A"+\text{condTermFlag}B"+\text{condTermFlagBase}" \text{ or}$$
$$\text{ctxIdxInc}=\text{condTermFlagBase}" \quad (2\text{-}3).$$

This method is similar to the above method 1-4).

$$\text{ctxIdxInc}=(\text{SpatialRes}_{Enhance}==\text{SpatialRes}_{Base})?1:0 \quad (2\text{-}4).$$

In this method, a value indicating whether or not spatial resolution of a picture in the base layer is equal to that of a picture in the enhanced layer (for example, a value of "1" when equal and a value of "0" when not equal) is used as a basis for determining the initial value of the probability function.

A combination of the above methods (2-1 to 2-4), rather than one of the above methods, may be used to determine the initial value of the probability function for probability coding of the flag "base_mode_refinement_flag". Next, a description will be given of a variety of methods for determining an index variable "ctxIdxInc" of a flag "residual_prediction_flag" indicating whether or not residual data of any macroblock has been coded using data predicted from residual data of a block in the base layer corresponding to the macroblock.

$$\text{ctxIdxInc}=\text{condTermFlag}A+\text{condTermFlag}B+\text{condTermFlagBase} \quad (3\text{-}1).$$

A flag "condTermFlagN" (N=A or B) has a value of "0" if a macroblock N is not available or if a flag "residual_prediction_flag" of the macroblock N is 0, otherwise it has a value of "1". Similarly, a flag "condTermFlagBase" has a value of "0" if a block in the base layer corresponding to the current macroblock is not present or if a flag "residual_prediction_flag" of the corresponding block is 0, otherwise it has a value of "1". That is, a value of corresponding coding information of the base layer is used as a basis for determining a value of the index variable "ctxIdxInc".

$$\text{ctxIdxInc}=(\text{BaseBlkSize}==\text{EnhanceBlkSize})?1:0+\text{condTermFlag}A+\text{condTermFlag}B \quad (3\text{-}2).$$

This method is similar to the above method 1-3).

$$\text{ctxIdxInc}=\text{condTermFlag}A"+\text{condTermFlag}B"+\text{condTermFlagBase}" \text{ or}$$
$$\text{ctxIdxInc}=\text{condTermFlagBase}" \quad (3\text{-}3).$$

This method is similar to the above method 1-4).

$$\text{ctxIdxInc}=(\text{refIdx}_{Enhance}L1==\text{refIdxBaseL1})?1:0+\text{refIdx}_{Enhance}L0==\text{refIdx}_{Base}L0)?1:0 \quad (3\text{-}4).$$

This method is similar to the above method 1-6).

ctxIdxInc=0 (if C≥threshold 1),
1 (if threshold 1>C≥threshold 2),
2 (if C<threshold 2)     (3-5).

This method is similar to the above method 1-5).

$$\text{ctxIdxInc}=(\text{SpatialRes}_{Enhance}==\text{SpatialRes}_{Base})?1:0 \quad (3\text{-}6).$$

This method is similar to the above method 2-4).

$$\text{ctxIdxInc}=\text{CBP}_{Base}?1:0 \quad (3\text{-}7).$$

In this method, the initial value of the probability function for coding the flag "residual_prediction_flag" is determined from a value of a Coded Block Pattern (CBP) of a corresponding block in the base layer. Here, a CBP of a luminance (or luma) block or a chrominance (or chroma) block of the base layer can be used as the CBP. The CBP of a block has a value other than "0" if a bit value other than "0" is present in the block, otherwise it has a value of "0". In this method, the initial value of the probability function for coding the flag "residual_prediction_flag" is set differently depending on a value indicating whether or not a value other than "0" is present in the corresponding block in the base layer, which is "1" when a value other than "0" is present and "0" when a value other than "0" is not present.

In the method of using the CBP for determining the initial value, the values of corresponding coding information "residual_prediction_flag" of adjacent blocks A and B, in addition to the above condition ($\text{CBP}_{Base}$?1:0), can be used as conditions for determining the index variable "ctxIdxInc". In this case, the index variable "ctxIdxInc" can be determined as follows:

$$\text{ctxIdxInc}=\text{CBP}_{Base}?1:0+\text{condTermFlag}A+\text{condTermFlag}B$$

Alternatively, the index variable "ctxIdxInc" may be determined based on the CBP values of the two adjacent blocks A and B as follows:

$$\text{ctxIdxInc}=\text{CBP}_A?1:0+\text{CBP}_B?1:0$$

A combination of the above methods (3-1 to 3-7), rather than one of the above methods, may be used to determine the initial value of the probability function for probability coding of the flag "residual_prediction_flag".

Modeling (for example, initial value setting) of coding information other than the coding information described above can also be performed in different manners, according to coding information of the base layer or according to an interlayer relationship.

For example, modeling for probability coding of a flag "intra_base_flag" indicating whether or not image data of an enhanced layer block has been coded into difference data based on image data of an intra mode block in the base layer corresponding to the enhanced layer block can also be performed in different manners, using an interlayer relationship (specifically, using corresponding coding information in the base layer) according to a similar method to that of 1-1), using an interlayer relationship of spatial resolution according to a similar method to that of 2-4), or using a quantization parameter representing the image quality level of the base layer according to a similar method to that of 1-4).

In addition, modeling for probability coding of information "mvd_ref_1X, X=0, 1" indicating a refinement value required for any macroblock to use motion vector information of a block in the base layer corresponding to the macroblock can also be performed in different manners, using an interlayer relationship (specifically, using corresponding coding information in the base layer) according to a similar method to that of 1-1) or using an interlayer relationship of spatial resolution according to a similar method to that of 2-4).

Further, modeling for probability coding of a flag "motion_prediction_flag_1X, X=0, 1" indicating whether or not a motion vector of a block of the base layer corresponding to a macroblock is to be used for a predictive motion vector of the macroblock can also be performed in different manners, using an interlayer relationship (specifically, using corresponding coding information in the base layer) according to a similar method to that of 1-1), using an interlayer relationship of spatial resolution according to a similar method to that of 2-4), or using a block size relationship according to a similar method to that of 1-3).

Modeling of the three information (intra_base_flag, mvd_ref_1X, motion_prediction_flag_1X) can also be performed using other interlayer relationships than the above-mentioned relationships.

The variety of modeling methods described above can also be applied to any other coding information whose value may be affected by the interlayer relationship.

Although the above description has been given as if the initial values "valMPS" and "pStateIdx" are determined from the index variable "ctxIdxInc", the two initial values are determined from values "m" and "n" which are determined from the index variable "ctxIdxInc".

An intermediate value "preCtxState" in the initial value determination routine of FIG. 4 is determined by a function "Clip3()". The preCtxState determination function "Clip3()" has a luminance quantization parameter "SliceQPY" as an argument (varX), in addition to the values "m" and "n". This argument (varX) is associated with a macroblock having coding information which is to be currently coded. The argument (varX), which has an influence on the initial value determination in addition to the values "m" and "n", has no value associated with the interlayer relationship.

Accordingly, if the interlayer relationship is reflected in the argument (varX) so that an initial value based on the interlayer relationship is obtained, the initial value is likely to have a value which is much more advantageous in terms of probability coding. Thus, according to the present invention, the interlayer relationship is reflected in the argument (varX).

Methods for reflecting the interlayer relationship in the argument (varX) are to use a luminance quantization parameter "BaseSliceQPY" of the base layer as the argument (varX), to use the difference between quantization parameters of the enhanced and base layers as the argument (varX), or to use the spatial resolution ratio between the base layer and the current layer as the argument (varX).

When the difference between the quantization parameters of the enhanced and base layers is used as the argument (varX), the preCtxState determination function 401 of FIG. 4 can be defined as follows according to the present invention:

preCtxState=Clip3 (1, 126, (($m$*(SliceQPYBaseSliceQPY))>>4)+$n$)

Figure 5:
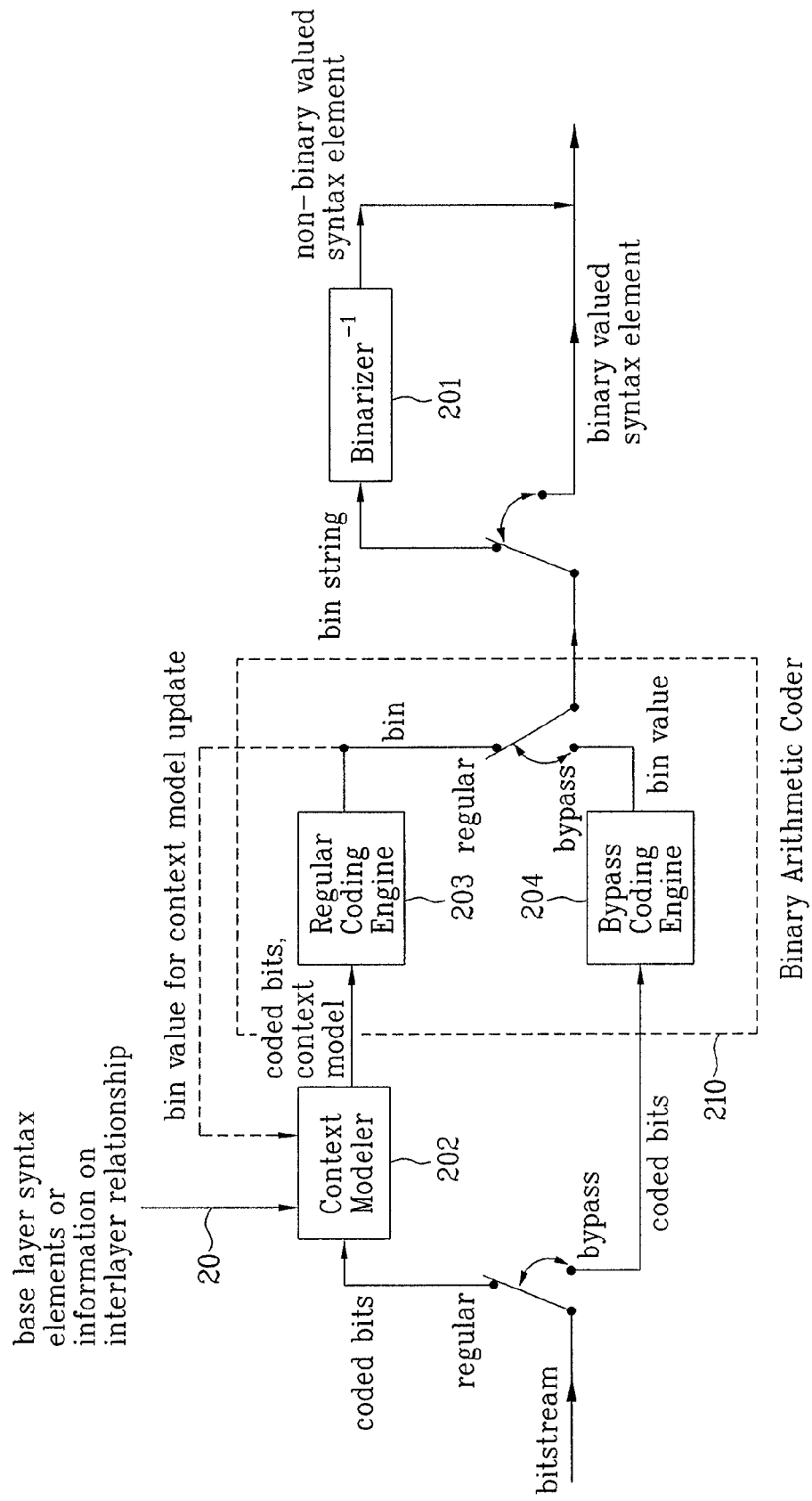
FIG. 5 is a block diagram of a CABAC executer of an enhanced layer decoder, which performs context modeling according to the present invention.

Although the above method has been described for probability coding in the encoder, the same method is applied to a CABAC decoder of FIG. 5 for decompressing compressed data. Thus, a description of context modeling in the decoder is omitted herein.

In a similar manner to the method whereby the context modeler 102 in the CABAC coder of FIG. 1 models target coding information, a context modeler 202 in the CABAC decoder of FIG. 5 models target coding information based on base layer coding information and interlayer relationship information 20 and passes a corresponding initial value to a regular decoding engine 203 provided subsequent to the context modeler 202. The regular decoding engine 203 converts bits of input coding information into an uncompressed bit string, starting from the same value as the initial value employed in the regular coding engine 103 in the encoder.

Figure 6:
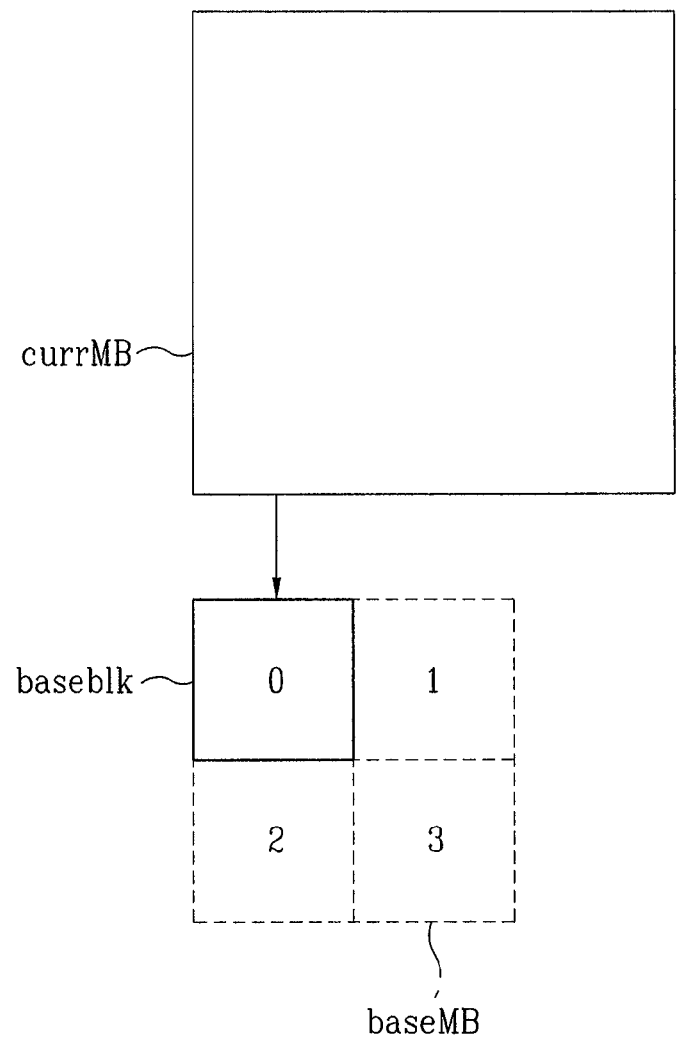
FIG. 6 illustrates block pattern information according to the present invention.

FIG. 6 illustrates details of Coded Block Pattern (CBP) information according to the present invention.

The block pattern information is a type of representative bit flag that indicates whether or not a residual is present, specifically whether or not a residual of an 8×8 luma block is present. For example, when a base macroblock (baseMB) corresponding to a macroblock (currMB) in a current picture is present in the base layer, the base macroblock is divided into 4 blocks, and the 0th bit of the block pattern information is set to indicate whether or not a residual is present in the upper left block, the 1st bit is set to indicate whether or not a residual is present in the upper right block, the 2nd bit is set to indicate whether or not a residual is present in the lower left block, and the 3rd bit is set to indicate whether or not a residual is present in the lower right block. The block pattern information is represented by 6 bits, including the 0th to 3rd bits and two bits (AC and DC) indicating chroma blocks. Thus, the block pattern information indicates whether or not a residual is present in each of the divided blocks and it is represented by "1" when a residual is present and it is represented by "0" when no residual is present. In addition, the initial value of the probability function for coding the residual prediction indicator information (residual_prediction_flag) is set differently depending on whether or not a value other than "0" is present in the corresponding block in the lower layer.

Figure 7:
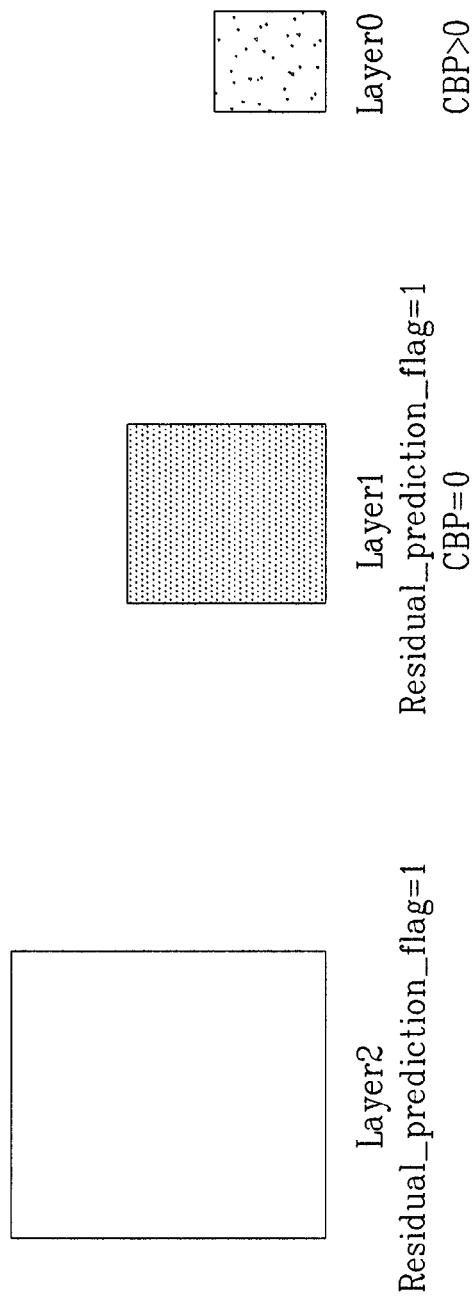
FIG. 7 illustrates how context modeling is performed using block pattern information and residual prediction indicator information according to the present invention.

FIG. 7 illustrates how context modeling is performed using block pattern information and residual prediction indicator information according to the present invention.

In an embodiment of the present invention, it is assumed that residual prediction indicator information is "1" in both layers 1 and 2 (Layer1 and Layer2) and block pattern information is "0" in the layer 1. In this case, coding information in the layer 1 cannot be used when performing context modeling of the layer 2. This is because the block pattern information of the layer 1 is "0", which indicates that no residual is present in a block of the layer 1 corresponding to the macroblock of the layer 2. However, it can be seen that a residual is present since block pattern information of layer 0 is greater than "0". From this, it follows that, even if the block pattern information of the layer 1 is "0", the residual prediction indicator information of the layer 1 must also be taken into consideration to determine whether or not a residual is actually present. Accordingly, the present invention uses an upsampled residual of the layer 0, which is a layer lower than the layer 1, when performing residual prediction of the layer 2.

A description will now be given of another embodiment of the present invention which provides a variety of methods for determining an index variable "ctxIdxInc" of a residual prediction indicator information "residual_prediction_flag" indicating whether or not residual data of any macroblock has been coded using data predicted from residual data of a block in the base layer corresponding to the macroblock.

ctxIdxInc=min (1, resPredFlag$_{base}$+CBP$_{base}$)　　　[Equation 1]

A method of Equation 1 is provided to select either "0" or "1" as a status of the index variable. If residual prediction indicator information of a corresponding macroblock of a base picture is "0", "0" is assigned to residual prediction indicator information (resPredFlagbase) of the base picture, otherwise "1" is assigned to it. Likewise, "0" or "1" is assigned to block pattern information (CBP$_{base}$) of the base picture. Thus, the sum of the residual prediction indicator information (resPredFlag$_{base}$) and the block pattern information (CBP$_{base}$) has a value of "0", "1", or "2". The index variable has a value of "0" or "1" since the smaller of "1" and the value of the sum ("0", "1", or "2") is assigned to the index variable.

$$\text{ctxIdxInc} = \text{resPredFlag}_{base} + \text{CBPbase} \quad \text{[Equation 2]}$$

A method of Equation 2 is provided to select either "0", "1", or "2" as a status of the index variable.

The following is a description of another embodiment of the present invention which provides a method for determining an index variable (ctxIdxInc) using the sum of values of residual information of corresponding blocks of a base picture. This embodiment can be applied when blocks of a current picture do not correspond respectively to blocks of a base picture, i.e., when there is a plurality of corresponding base macroblocks.

$$\text{Energy}_{base} = \Sigma_i \Sigma_j P_{base ij} \quad \text{[Equation 3]}$$

In Equation 3, "$P_{base,ij}$" denotes a pixel value at a position (i,j) of residual information of a corresponding block in a base picture. "$\text{Energy}_{base}$" indicates whether or not a residual is present, which can be determined by searching all pixels in the corresponding block in the base picture.

$$\text{ctxIdxInc} = \text{Energy}_{base}?1:0 \quad \text{[Equation 4]}$$

In a method expressed by Equation 4, all pixels are searched to determine whether or not a picture value is present and "1" is assigned to the index variable if any pixel value is present and "0" is assigned to the index variable if no pixel value is present.

$$0 \; \text{Energy}_{base} <= \text{thresh 1}$$

$$\text{ctxIdxInc} = 1 \; \text{thresh1} < \text{Energy}_{base} < \text{thresh2}$$

$$2 \; \text{Energy}_{base} >= \text{thresh2} \quad \text{[Equation 5]}$$

A method expressed by Equation 5 uses a plurality of thresholds (thresh1 and thresh2) such that "0" is assigned to the index variable if the total sum of pixel values is less than or equal to the threshold (thresh1), "1" is assigned to the index variable if the total sum is between the thresholds (thresh1 and thresh2), and "2" is assigned to the index variable if the total sum is equal to or greater than the threshold (thresh2).

The decoder, which includes the context modeler for modeling coding information according to the method described above, can be incorporated into a mobile communication terminal, a media player, or the like.

Although this invention has been described with reference to the preferred embodiments, it will be apparent to those skilled in the art that various improvements, modifications, replacements, and additions can be made in the invention without departing from the scope and spirit of the invention. Thus, it is intended that the invention cover the improvements, modifications, replacements, and additions of the invention, provided they come within the scope of the appended claims and their equivalents.

INDUSTRIAL APPLICABILITY

As described above with reference to the limited embodiments, the present invention performs context modeling of each bit of the coding information using an interlayer correlation, so as to determine an initial value of a function for probability coding of the coding information, which is advantageous in terms of probability coding, (i.e., an initial value which further reduces the initial probability of the LPS), thereby significantly increasing the data compression rate of probability coding.

What is claimed is:

1. A method for decoding a video signal performed by a decoding apparatus, comprising:
   receiving the video signal, the video signal including a bitstream of an enhanced layer and a bitstream of a base layer;
   parsing first coding information from the bitstream of the enhanced layer, the first coding information indicating whether residual data of an image block in the enhanced layer is predicted from residual data of a corresponding block in the base layer; and
   decoding the video signal based on the first coding information,
   wherein the parsing comprises performing modeling of the first coding information based on second coding information, the second coding information indicating whether prediction information of the corresponding block in the base layer is used to decode the image block in the enhanced layer, the prediction information including a prediction mode, partition information and motion information, the prediction mode including an intra mode and an inter mode, the motion information including a motion vector and a reference index, and
   wherein the modeling includes,
   deriving a context index increment based on the second coding information and a context index offset for the first coding information;
   deriving quantization parameter information associated with a slice from the bitstream of the enhanced layer;
   obtaining an intermediate variable based on the context index increment and the quantization parameter information, the intermediate variable indicating a variable being used for an initial process of context modeling; and
   deriving an initial value of a probability coding function based on the intermediate value.

2. The method of claim 1, wherein at least one of an image quality and a spatial resolution of the enhanced layer is different from at least one of an image quality and a spatial resolution of the base layer,
   wherein the image quality is based on a quantization step size.

3. The method of claim 2, wherein the image quality of the base layer is lower than the image quality of the enhanced layer.

4. The method of claim 1, wherein the initial value of the probability coding function includes at least one of probability state information (pStateIdx) and most probable value information for the probability coding function (valMPS).

5. An apparatus of decoding a video signal, comprising:
   a receiving unit configured to receive the video signal including a bitstream of an enhanced layer and a bitstream of a base layer;
   a decoding unit configured to parse first coding information from the bitstream of the enhanced layer, the first coding information indicating whether residual data of an image block in the enhanced layer is predicted from residual data of a corresponding block in the base layer, and the decoding unit configured to decode the video signal based on the first coding information,
   wherein the decoding unit includes a context modeler configured to model the first coding information based on the second coding information, the second coding information indicating whether prediction information of the corresponding block in the base layer is used to decode the image block in the enhanced layer, the prediction information including a prediction mode, partition information and motion information, the prediction mode including an intra mode and an inter mode, the motion information including a motion vector and a reference index, and wherein the context modeler is further configured to derive a context index increment based on the second coding information and a context index offset for the first coding information, and derive an initial value of a probability coding function based on the context index increment.

6. The apparatus of claim 5, wherein at least one of an image quality and a spatial resolution of the enhanced layer is different from at least one of an image quality and a spatial resolution of the base layer, wherein the image quality is based on a quantization step size.

7. The apparatus of claim 6, wherein the image quality of the base layer is lower than the image quality of the enhanced layer.

8. The method of claim 5, wherein the initial value of the probability coding function includes at least one of probability state information (pStateIdx) and most probable value information for the probability coding function (valMPS).

* * * * *